(12) United States Patent
Yavagal

(10) Patent No.: US 11,232,788 B2
(45) Date of Patent: Jan. 25, 2022

(54) WAKEWORD DETECTION

(71) Applicant: Amazon Technologies, Inc., Seattle, WA (US)

(72) Inventor: Deepak Yavagal, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 16/215,135

(22) Filed: Dec. 10, 2018

(65) Prior Publication Data

US 2020/0184966 A1 Jun. 11, 2020

(51) Int. Cl.
*G10L 15/22* (2006.01)
*G10L 15/08* (2006.01)
*G10L 15/30* (2013.01)
*G10L 15/32* (2013.01)
(Continued)

(52) U.S. Cl.
CPC ............. *G10L 15/22* (2013.01); *G10L 15/08* (2013.01); *G10L 15/30* (2013.01); *G10L 25/84* (2013.01); *G10L 2015/088* (2013.01)

(58) Field of Classification Search
CPC ......... G06F 3/167; G10L 13/00; G10L 15/00; G10L 15/01; G10L 15/06; G10L 15/08; G10L 15/22; G10L 15/26; G10L 15/30; G10L 15/227; G10L 15/228; G10L 2015/221; G10L 2015/223; G10L 2015/088; G10L 25/78; G10L 25/84; G10L 25/87; G10L 2025/783; G10L 2025/786; G10L 17/10; G10L 17/12; G10L 17/14; G10L 17/22; G10L 17/24; G10L 17/26; G10L 15/20; G10L 15/32; G10L 25/80; G10L 17/00; G10L 17/08; H04L 47/10; H04N 5/44513
USPC ..... 704/260, 4, 208–257, 270–276; 715/716, 715/727, 728, 978; 700/1, 2, 5, 12, 13, 700/14, 94
See application file for complete search history.

(56) References Cited

U.S. PATENT DOCUMENTS 5,737,489 A * 4/1998 Chou .................... G10L 15/063
704/256
10,388,276 B2 8/2019 Sun et al.
10,504,511 B2 12/2019 Wang et al.
(Continued)

OTHER PUBLICATIONS

Office Action dated Feb. 4, 2020 for U.S. Appl. No. 16/017,062.
(Continued)

*Primary Examiner* — Leshui Zhang
(74) *Attorney, Agent, or Firm* — Pierce Atwood LLP

(57) ABSTRACT

A device having a voice-based interface activates or "wakes" when it detects an utterance that includes a wakeword. The device includes a digital-signal processor (DSP) that implements a first, lower-power speech-processing component that detects when captured audio includes the wakeword; the first speech-processing component then activates a second, higher-accuracy wakeword detection component that confirms that the captured audio includes the wakeword. The device may configure a wakeword-detection parameter, speaker-identification parameter, and/or wakeword-detection model of the first speech-processing component based on device-use data corresponding to the device, such as an environment of the device and/or a usage pattern of the user of the device.

25 Claims, 12 Drawing Sheets

(51) Int. Cl.
 *G10L 25/84* (2013.01)
 *G10L 17/08* (2013.01)

(56) References Cited

U.S. PATENT DOCUMENTS

| | | | |
|---|---|---|---|
| 10,515,623 B1 | 12/2019 | Grizzel | |
| 10,515,625 B1 | 12/2019 | Metallinou et al. | |
| 2002/0194003 A1 | 12/2002 | Mozer | |
| 2014/0350924 A1 | 11/2014 | Zurek et al. | |
| 2015/0081296 A1* | 3/2015 | Lee | G10L 15/20 704/239 |
| 2015/0340032 A1* | 11/2015 | Gruenstein | G06N 3/08 704/232 |
| 2016/0055847 A1 | 2/2016 | Dahan | |
| 2016/0077794 A1* | 3/2016 | Kim | G06F 3/167 704/275 |
| 2016/0189706 A1 | 6/2016 | Zopf et al. | |
| 2017/0031420 A1* | 2/2017 | Wong | G06F 3/167 |
| 2018/0108351 A1* | 4/2018 | Beckhardt | G10L 15/32 |
| 2018/0233150 A1* | 8/2018 | Gruenstein | G10L 15/26 |
| 2018/0336886 A1* | 11/2018 | Sun | G06N 3/08 |
| 2019/0272820 A1* | 9/2019 | Xiang | G10L 15/02 |
| 2019/0311715 A1* | 10/2019 | Pfeffinger | G06F 3/167 |

OTHER PUBLICATIONS

De Meuleneire International Search Report and Written Opinion issued in International Application No. PCT/US2019/064186, dated Jul. 6, 2020, 16 pages.

* cited by examiner

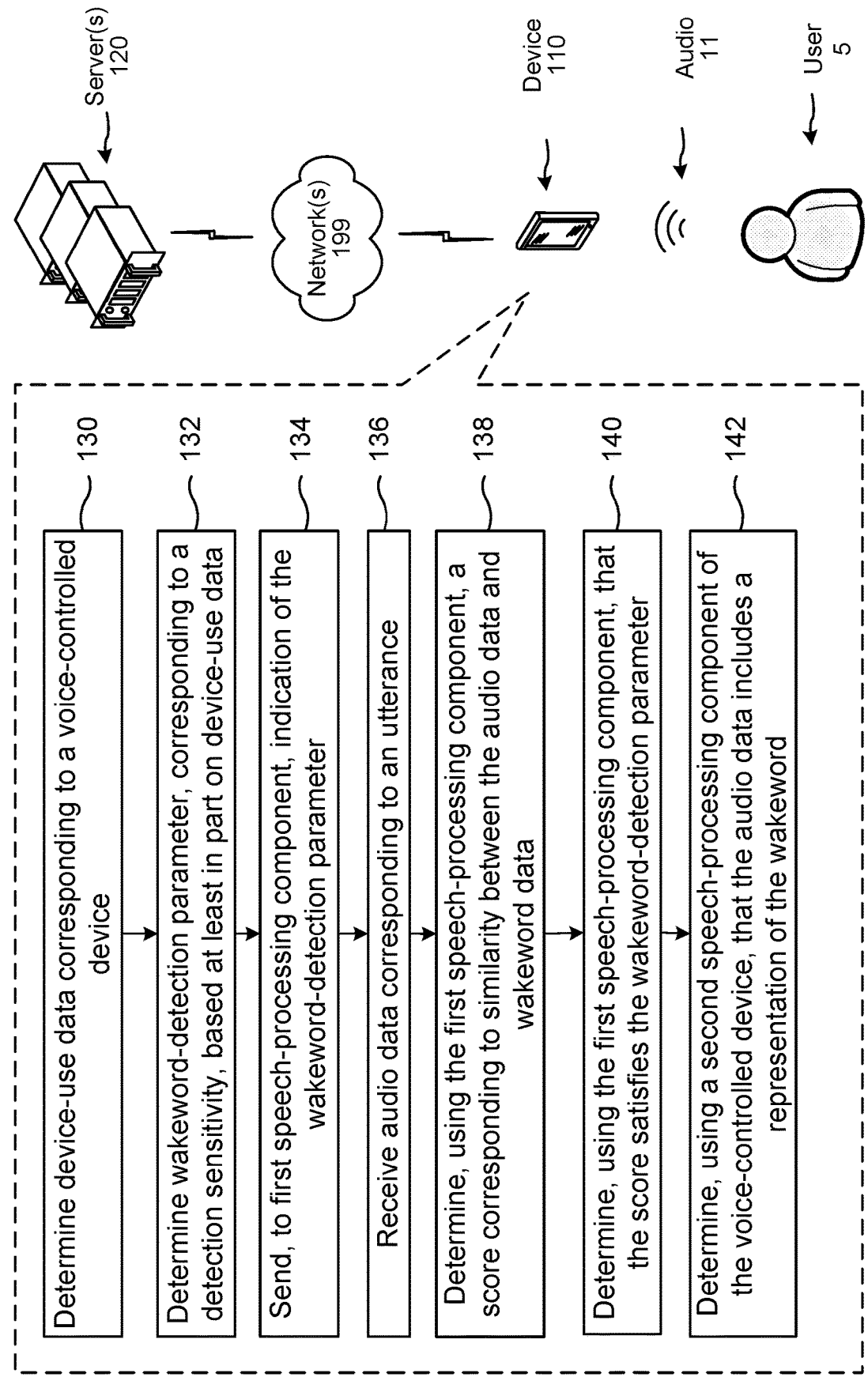

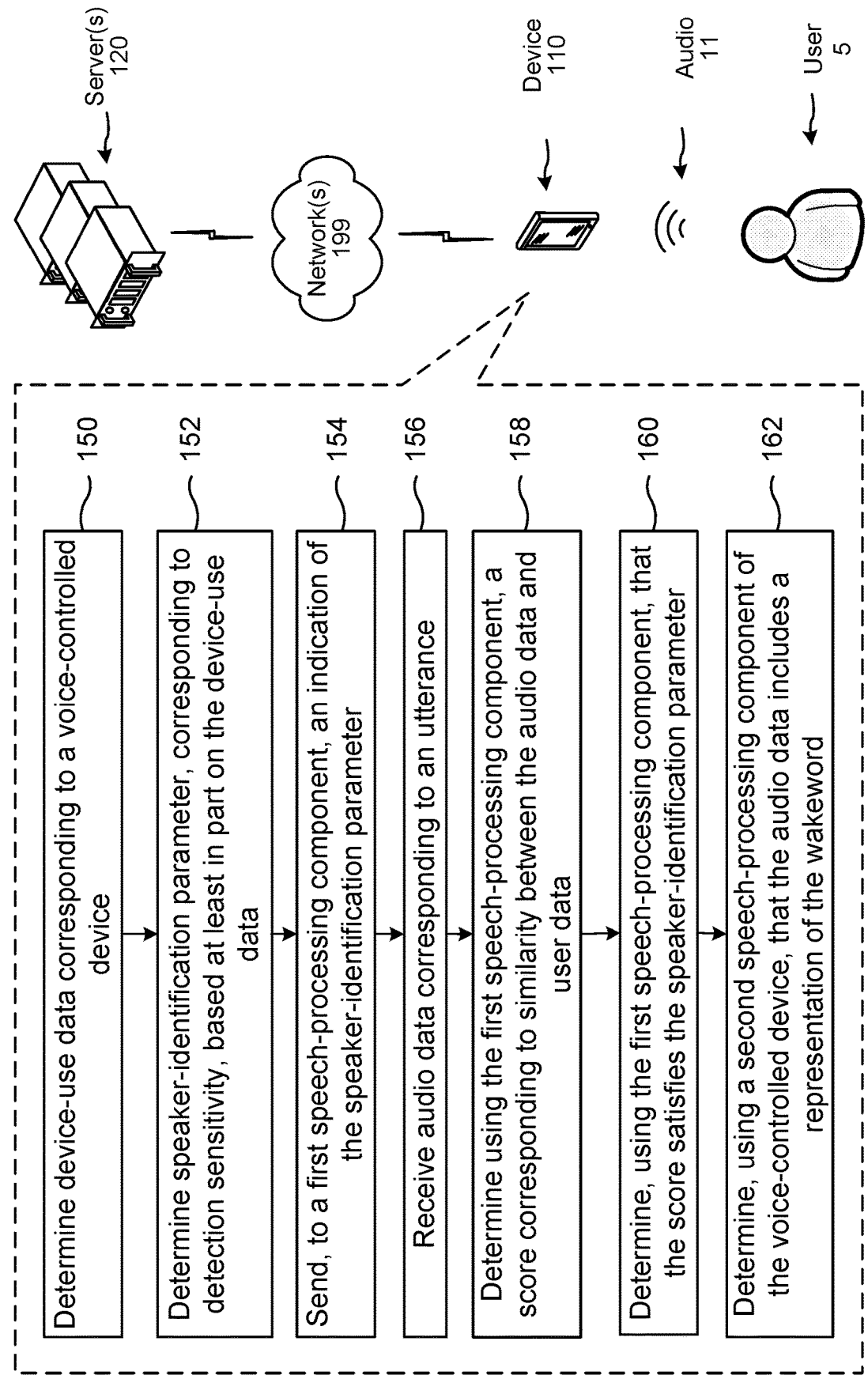

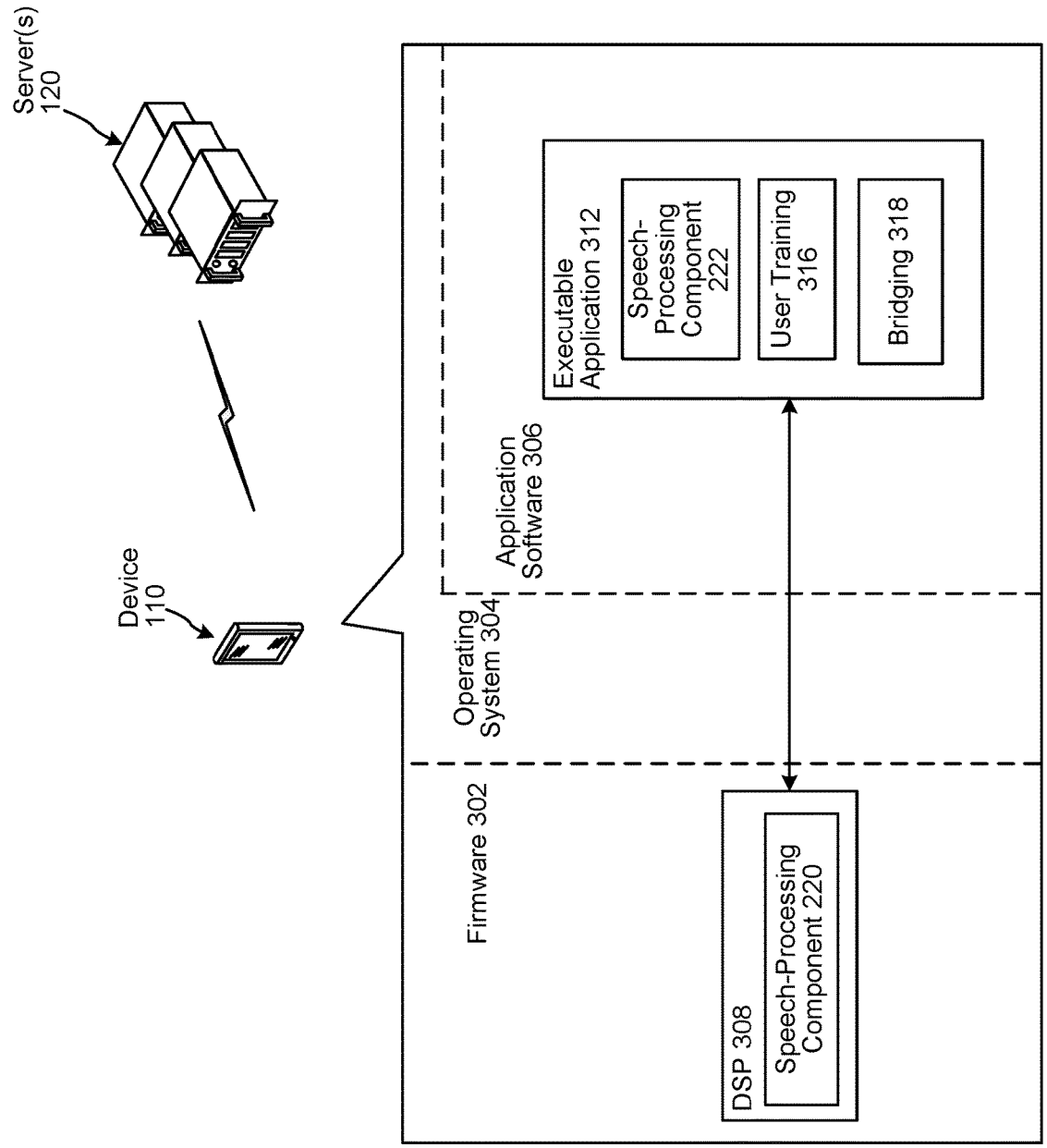

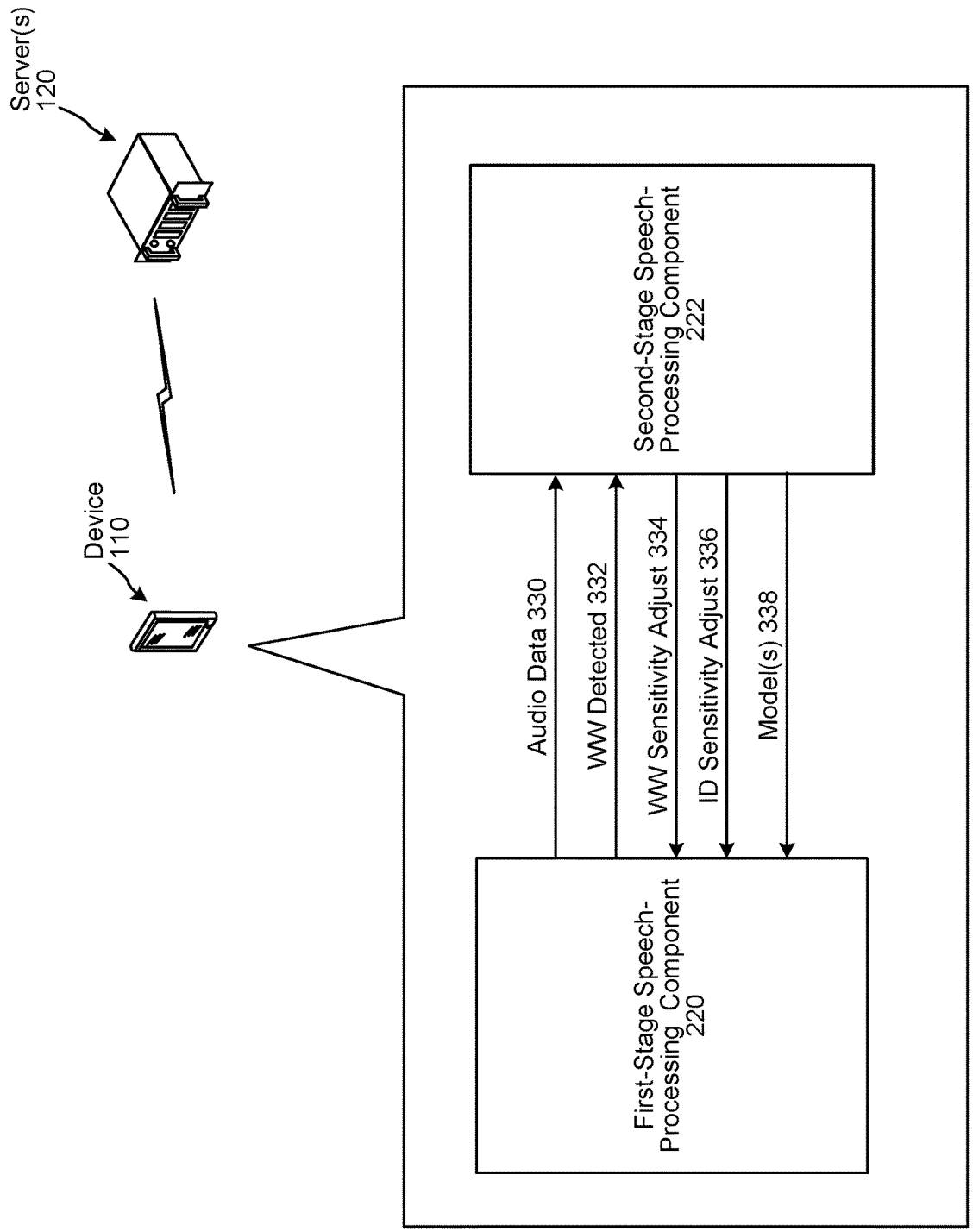

WAKEWORD DETECTION

BACKGROUND

Speech-recognition systems have progressed to a point at which human users are able to control computing devices using their voices. These systems employ techniques to identify words spoken by the user based on the various qualities of a received audio input. Speech-recognition processing combined with natural-language understanding processing enables voice-based control of a computing device to perform tasks based on the user's spoken commands. The combination of speech-recognition processing and natural-language understanding processing is referred to herein as speech processing. Speech processing may also involve converting a user's speech into text data, which may then be provided to other applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to detect user input using different speech-processing components according to embodiments of the present disclosure.

FIGS. 3A and 3B are conceptual diagrams of speech-processing components of a device according to embodiments of the present disclosure.

DETAILED DESCRIPTION

Figure 2:
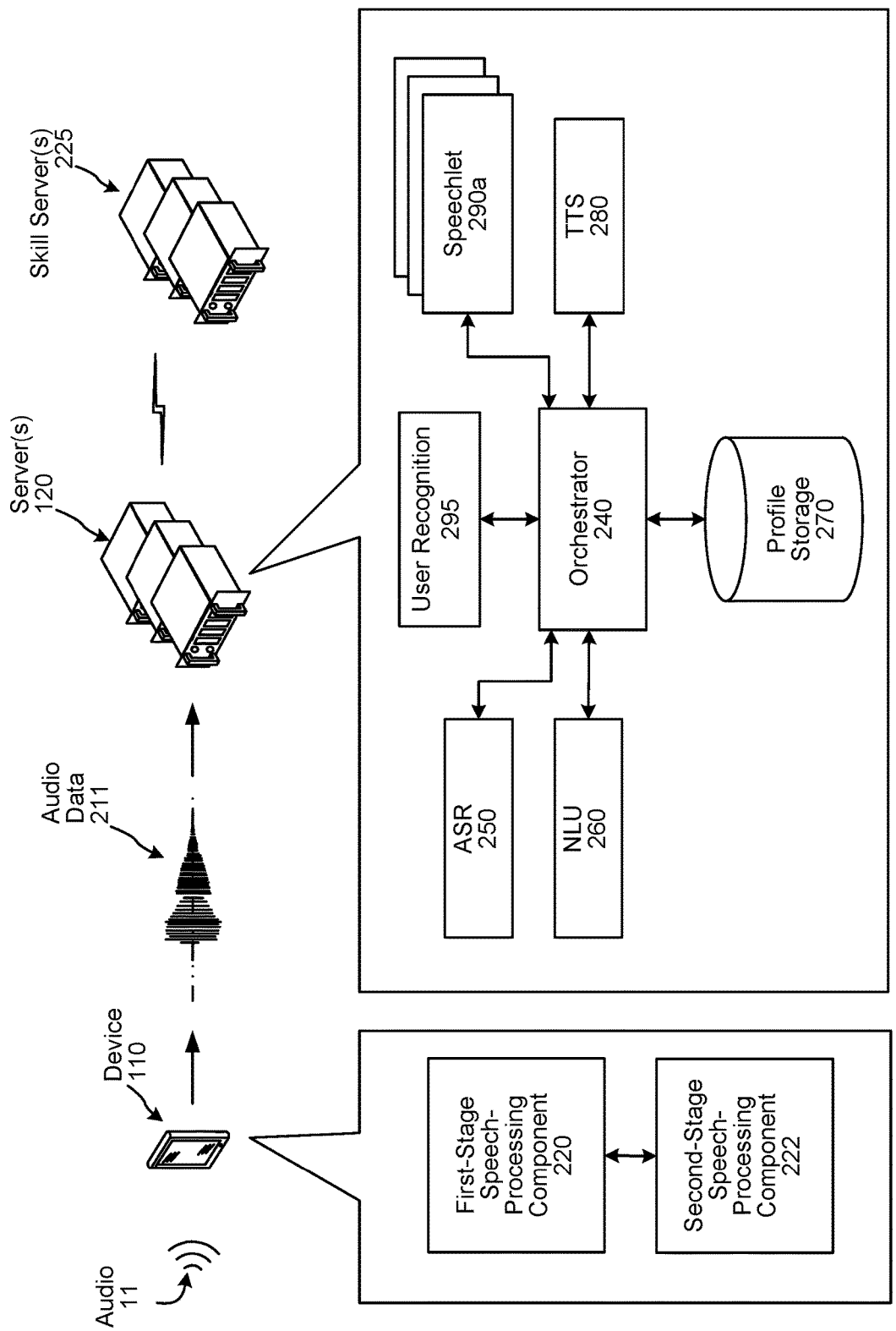
FIG. 2 is a conceptual diagram of components of a system according to embodiments of the present disclosure.

Automatic speech recognition (ASR) is a field of computer science, artificial intelligence, and linguistics that relates to transforming audio data representing speech into text data representative of that speech. Natural-language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech-processing system.

Certain systems may be configured to perform actions responsive to user inputs. For example, a system may be configured to output weather information in response to a user input including to "Alexa, what is the weather." As a further example, a system may be configured to output music performed by Toto in response to a user input corresponding to "Alexa, play Africa by Toto."

A device may be configured to receive a spoken user input, detect a wakeword (such as a keyword) in the user input, and perform an action in response to detecting the wakeword. For example, in response to the device detecting the wakeword, the device may send audio data, representing the user input, to a server(s) for processing (e.g., speech processing and command processing).

The present disclosure improves computing devices by implementing a first-stage, lower-power speech-processing component that detects a representation of a wakeword in audio data and activates a second-stage, higher-accuracy speech-processing component that verifies the presence of the representation of the wakeword in the audio data. Based on device-use data (such as, for example, a location of the device, an environment of the device, a usage pattern of a user of the device, and/or any other type of information represented as device-use data generated by the device), the system may configure the first-stage, lower-power speech-processing component to have different parameters for detecting the wakeword and/or determining an identity of a speaker. The parameters may include, for example, a wakeword sensitivity parameter corresponding to a wakeword-detection threshold, which may be a value between 0 and 1, and an identity-sensitivity parameter corresponding an identity-detection threshold, which may similarly be a value between 0 and 1. The system may further configure the first-stage, lower-power speech-processing component to select one of a plurality of different wakeword-detection models. Upon detection of the wakeword, the device may determine that the audio data also includes a command or request; the device may execute an action corresponding to the command or request and/or determine content data corresponding to the command or request and output content corresponding to the content data.

The device may include a digital signal processor (DSP) configured with the lower-power speech-processing component. The device may further include a software application configured with the higher-accuracy speech-processing component. An example of such a software application is the Amazon Alexa application that may be installed on various smart phones, tablets, smart speakers, and other devices. The speech-processing components of the DSP and/or application may be trained using the user's speech. The user may be requested to speak particular utterances to the device and the device may use the utterances to train the speech-processing component detector of the DSP and/or application.

The speech-processing component of the DSP and/or application may require audio data representing numerous spoken wakewords in order for the wakeword detector to be trained. The application's speech-processing component may be considered more accurate than the speech-processing component implemented in the DSP because the application's speech-processing component may have access to additional input signals, more processing power, and/or a more sophisticated wakeword model.

FIGS. 1A and 1B illustrates systems configured to detect wakewords and/or perform speaker identification in accordance with the present disclosure. Although the figures and discussion of the present disclosure illustrate certain operational steps of the system in a particular order, the steps described may be performed in a different order (as well as certain steps removed or added) without departing from the intent of the disclosure.

With reference first to FIG. 1A, in various embodiments, a voice-controlled device 110 receives audio 11 from a user 5. The device 110 may communicate with one or more servers 120 across one or more networks 199. The device determines (130) device-use data corresponding to a voice-controlled device (such as, for example, a location of the voice-controlled device, an environment of the voice-controlled device, and a usage pattern of the voice-controlled device) and determines (132) a wakeword-detection parameter based at least in part on the device-use data; the wakeword-detection parameter corresponds to a wakeword-detection sensitivity. The determination of the device-use data and/or wakeword detection parameter may be performed by a first speech-processing element of the device 110, by a second speech-processing element of the device 110, and/or by another component of the device 110. The device 110 sends (134), to the first speech-processing component (for example, a lower-power speech-processing component in a DSP), an indication of the wakeword-detection parameter, which may be a parameter or a command to use a predetermined parameter. The device receives (136) audio data corresponding to an utterance. The device determines (138), using the first speech-processing component, a score corresponding to similarity between the audio data and a wakeword. If the score does not satisfy the wakeword-detection parameter, the device may take no further action regarding the audio data. The device, however, may determine (140), using the first speech-processing component, that the score satisfies the wakeword-detection parameter. For example, the score may be greater than a wakeword-detection threshold, thus satisfying a condition corresponding to a parameter of the first speech-processing component. The device determines (142), using a second speech-processing component of the voice-controlled device 110 (for example, a second-stage, higher-accuracy speech-processing component), that the audio data includes the representation of a wakeword. As explained in greater detail below, the device 110 may select and use a wakeword-detection model and/or speaker identification model or either or both of the first and second speech-processing components based on the location. The device 110 may further determine and use a speaker-identification parameter based on the location.

With reference to FIG. 1B, in various embodiments, the device determines (150) device-use data corresponding to a voice-controlled device and determines (152) a speaker-identification parameter based at least in part on the device-use data; the speaker-identification parameter may be a speaker-identification sensitivity. The determination of the device-use data and/or wakeword-detection parameter may be performed by a first speech-processing element of the device 110, by a second speech-processing element of the device 110, and/or by another component of the device 110. The device 110 sends (154), to a first speech-processing component, an indication of the speaker-identification parameter. The device receives (156) audio data corresponding to an utterance. If the score does not satisfy the speaker-identification parameter, the device may take no further action regarding the audio data. The device, however, may determine (158), using the first speech-processing component, a score corresponding to similarity between the audio data and user data and determines (160), using the first speech-processing component, that the score satisfies the speaker-identification parameter. The device determines (162), using a second speech-processing component of the voice-controlled device, that the audio data includes a representation of a wakeword. The second speech-processing component may, in addition determine a score corresponding to a similarity between the audio data and user data and may further determine that the score satisfies the speaker-identification parameter. As explained in greater detail below, the device 110 may select and use wakeword-detection and/or speaker-identification models for either or both of the first and second speech-processing components based on the device-use data. The device 110 may further determine and use a wakeword-detection threshold based on the device-use data.

The system may operate using various components as described in FIG. 2. The various components may be located on same or different physical devices. Communication between various components may occur directly or across a network(s) 199.

An audio capture component(s), such as a microphone or array of microphones of a device 110, captures audio 11 and creates corresponding audio data. The device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

A first-stage speech-processing component 220 and/or second-stage speech-processing component 222 may determine that the audio data contains a representation of a wakeword. The first-stage speech-processing component 220 and/or second-stage speech-processing component 222 may determine if and when a user intends to speak an input to the device 110. An example wakeword is "Alexa."

In some embodiments, the first-stage speech-processing component 220 processes the audio data only after speech is detected in the audio data using, for example, the VAD system described above; in other embodiments, the first-stage speech-processing component 220 continually processes the audio data to determine presence of the wakeword whether or not speech has been detected in the audio data. As explained in greater detail below, the first-stage speech-processing component 220 may be implemented in firmware of the device 110, in a digital-signal processor (DSP) of the device 110, or in similar circuitry. The first-stage speech-processing component 220 may be implemented to consume a relatively small amount of power as compared to, as explained in greater detail below, one or more second-stage speech-processing component(s) 222 that, while being able to more accurately determine if the audio data includes the wakeword, may consume more power than the first-stage speech-processing component 220.

The second-stage speech-processing component 222 may process the audio data 211 to confirm presence of the wakeword after the first-stage speech-processing component 220 determines that the audio 11 contains the wakeword. The second-stage speech-processing component 222 may include data corresponding to a digital representation of the wakeword and may compare, using a trained model, the audio data 211 to audio data corresponding to a representation of the wakeword. Wakeword detection may be performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to the wakeword.

Thus, the wakeword detection components 220, 222 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection components 220, 222 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected by both the first-stage wakeword detection component 220 and the second-stage wakeword detection component 222, the device 110 may wake and begin transmitting audio data 211, representing the audio 11, to the server(s) 120. The audio data 211 may include data corresponding to the wakeword; in other embodiments, the portion of the audio corresponding to the wakeword is removed by the device 110 prior to sending the audio data 211 to the server(s) 120.

Upon receipt by the server(s) 120, the audio data 211 may be sent to an orchestrator component 240. The orchestrator component 240 may include memory and logic that enables the orchestrator component 240 to transmit various pieces and forms of data to various components of the system, as well as perform other operations as described herein.

The orchestrator component 240 may send the audio data 211 to an ASR component 250, which may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The NLU component 260 attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the server(s) 120, a speechlet component 290, a skill server(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with device-use data corresponding to the device 110, such as a geographic location of the device 110. In another example, if the text data corresponds to "turn off the lights," the NLU component 260 may determine an intent that the system turn off lights associated with the device 110 or the user 5.

The NLU results data may be sent from the NLU component 260 (which may include tagged text data, indicators of intent, etc.) to a speechlet component(s) 290. If the NLU results data includes a single NLU hypothesis, the NLU component 260 may send the NLU results data to the speechlet component(s) 290 associated with the NLU hypothesis. If the NLU results data includes an N-best list of NLU hypotheses, the NLU component 260 may send the top scoring NLU hypothesis to a speechlet component(s) 290 associated with the top scoring NLU hypothesis.

A "speechlet component" may be software running on the server(s) 120 that is akin to a software application. That is, a speechlet component 290 may enable the server(s) 120 to execute specific functionality in order to provide data or produce some other requested output. The server(s) 120 may be configured with more than one speechlet component 290. For example, a weather service speechlet component may enable the server(s) 120 to provide weather information, a car service speechlet component may enable the server(s) 120 to book a trip with respect to a taxi or ride sharing service, a restaurant speechlet component may enable the server(s) 120 to order a pizza with respect to the restaurant's online ordering system, etc. A speechlet component 290 may operate in conjunction between the server(s) 120 and other devices, such as the device 110, in order to complete certain functions. Inputs to a speechlet component 290 may come from speech processing interactions or through other interactions or input sources. A speechlet component 290 may include hardware, software, firmware, or the like that may be dedicated to a particular speechlet component 290 or shared among different speechlet components 290.

A skill server(s) 225 may communicate with a speechlet component(s) 290 within the server(s) 120 and/or directly with the orchestrator component 240 or with other components. A skill server(s) 225 may be configured to perform one or more actions. An ability to perform such action(s) may sometimes be referred to as a "skill." That is, a skill may enable a skill server(s) 225 to execute specific functionality in order to provide data or perform some other action requested by a user. For example, a weather service skill may enable a skill service(s) 225 to provide weather information to the server(s) 120, a car service skill may enable a skill server(s) 225 to book a trip with respect to a taxi or ride sharing service, an order pizza skill may enable a skill server(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a speechlet component 290 dedicated to interacting with the skill server(s) 225. Unless expressly stated otherwise, reference to a speechlet, speechlet device, or speechlet component may include a speechlet component 290 operated by the server(s) 120 and/or skill operated by the skill server(s) 225. Moreover, the functionality described herein as a speechlet or skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a speechlet component 290, the orchestrator component 240, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include a user-recognition component 295 that recognizes one or more users associated with data input to the system. The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The server(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 3A illustrates a device 110 having firmware 302, an operating system 304, and application software 306; the operating system 304 may be used, among other things, to pass data and/or commands between the firmware 302 and application software 306. The firmware includes a DSP 308 that implements a first-stage speech-processing component 220. The application software 306 includes an executable application 312 that includes a second-stage speech-processing component 222; the application software 306 may further include a user-training component 316 and/or a bridging component 318.

The user-training component 316 of the executable application 312 may request the user 5 provide permission to use the user's speech to train the speech-processing components 220, 222. If the user 5 provides such permission (e.g., in the form of verbal consent, consent given via a touch sensitive surface, or consent given through some other modality), the executable application 312 may use subsequently received user speech to train the speech-processing components 220, 222. The speech used to train the wakeword detection components 220, 222 may correspond to a particular wakeword (or other speech) spoken in response to a prompt output by the device 110.

The user-training component 316 may be implemented by the server(s) 120 rather than the device 110. In such an implementation, captured speech of the user may be sent to the server(s) 120. The server(s) 120 may train a machine-learning model for wakeword detection and/or speaker identification using the speech. Once the machine-learning model is trained, the server(s) 120 may send the trained model to the device 110 so the wakeword detection components 220, 222 can implement the trained model(s) (trained using the user's speech).

If the wakeword detection components 220, 222 determine that the audio data includes the wakeword and, in some embodiments, that the user 5 uttered the wakeword, the executable application 312 may send, via, e.g., a bridging component 318, audio data representing the entirety of the user input or audio data representing the portion of the input corresponding to the wakeword. The bridging component 318 may be a component that has protocols that enables the executable application 312 to communicate with the server(s) 120.

FIG. 3B illustrates data and/or commands that may pass between the first-stage speech-processing component 220 and the second-stage speech-processing component 222. The first-stage speech-processing component 220 may send, to the second-stage speech-processing component 222, audio data 330 corresponding to an utterance. The first-stage speech-processing component 220 may send the audio data 330 continually, in response to detection of voice in the audio data 330, and/or upon detecting a wakeword in the audio data 330. The audio data 330 may be a digital representation of audio and/or a feature vector corresponding to the audio. The first-stage speech-processing component 220 may further send, to the second-stage speech-processing component 222, an indication 332 of detection of the wakeword, which may include a yes/no decision and/or a confidence score corresponding to a level of confidence that the audio contains the wakeword.

As explained in greater detail below, the second-stage speech-processing component 222 may send, to the first-stage speech-processing component 220, a command 334 including a parameter to adjust a wakeword-detection sensitivity of the first-stage speech-processing component 220. The first-stage speech-processing component 220 may, in response, lower its wakeword-detection sensitivity such that it detects the wakeword and/or audio that resembles the wakeword more frequently in the audio or raise its wakeword detection sensitivity such that it detects the wakeword and/or audio that resembles the wakeword less frequency in the audio. The wakeword-sensitivity parameter may be a wakeword-detection threshold that may be, for example, a value between 0 and 1. If the wakeword-detection threshold is at or near 0, the first-stage speech-processing component 220 may be more likely to determine that a wakeword is present in audio data 402. The second-stage speech-processing component 222 may so command the first-stage speech-processing component 220 when the location of the device 110 is determined to be in a private location; the lower wakeword-detection threshold may allow the device 110 to detect that the wakeword is present in, for example, audio data having a low volume. The second-stage speech-processing component 222 may send, to the first-stage speech-processing component 220, a different wakeword-sensitivity parameter when the device-use data corresponds to a public location; this wakeword-sensitivity parameter may be a wakeword-detection threshold at or near 0. This wakeword-sensitivity parameter may enable the device 110 to differentiate between a wakeword spoken by a user of the device 110 and background noise associated with the public location.

The second-stage speech-processing component 222 may instead or in addition send, to the first-stage speech-processing component 220, another command 336 to adjust a speaker-identification sensitivity of the first-stage speech-processing component 220. The first-stage speech-processing component 220 may, in response, lower its speaker-identification sensitivity such that it is more likely to determine that an utterance represented in the audio data 330 matches utterance data associated with a particular user or users or raise its speaker-identification sensitivity such that it is more likely to determine that an utterance represented in the audio data 330 does not utterance data associated with a particular user or users.

The second-stage speech-processing component 222 may further send, to the first-stage speech-processing component 220, one or more wakeword-detection and/or speaker-identification model(s) 338. As explained in greater detail below, a given model 338 may be selected based on device-use data, such as a user, a location, an environment, and/or input data. The second-stage speech-processing component 222 may further select its own wakeword-detection and/or speaker-identification model based on the device-use data.

Figure 4:
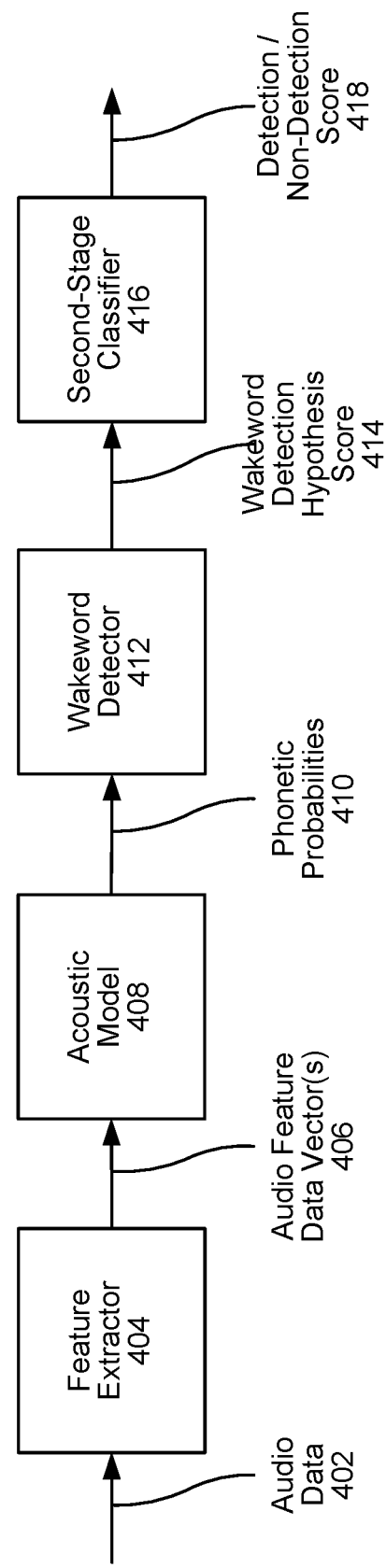
FIG. 4 is a conceptual diagram of a speech-processing component according to embodiments of the present disclosure.

FIG. 4 illustrates a system for wakeword detection in accordance with embodiments of the present invention. A feature extractor 404 receives audio data 402 and outputs corresponding feature vectors 406. An acoustic model 408 creates phonetic probabilities 410 using the feature vectors 408. A wakeword detector 412 creates a wakeword-detection hypothesis score 414 based on the phonetic probabilities 410; the wakeword-detection hypothesis score may be a score corresponding to a likelihood that the wakeword is present in the audio data 402. The score may be, for example, 0 (corresponding to no likelihood that the wakeword is represented in the phonetic probabilities 410, 1 (corresponding to a certainty that the wakeword is represented in the phonetic probabilities 410), or between 0 and 1 (for example, 0.5 corresponding to a 50% likelihood that the wakeword is represented in the phonetic probabilities 410). In some embodiments, a second-stage classifier 416 outputs a detection/non-detection determination score 418 based thereon. The detection/non-detection determination score 410 may be one value (e.g., 0) corresponding to non-detection and another value (e.g., 1) corresponding to detection. The first-stage wakeword detection component 220 and/or the second-stage wakeword detection component 222 may include some or all of these components. The system may determine that the wakeword is present in the phonetic probabilities 410 by comparing the wakeword detection hypothesis score 414 to a wakeword detection threshold; the wakeword detection threshold may be determined by a wakeword sensitivity parameter, which in turn may be determined using device-use data.

The feature extractor 404 receives audio data 402 corresponding to an utterance and outputs one or more feature vectors 406 that represent one or more features of the audio data 402. The audio data 402 may be a time-domain, digital representation of corresponding audio, which may include an utterance. The feature extractor 404 may be, for example, a convolutional recurrent neural network (CRNN) or other such model. The feature extractor 404 may be configured to extract, from the input audio data 402, feature data 406 corresponding to features that may be relevant to audio classification and/or other operations performed by other components. The feature extractor 404 may include a convolutional recurrent neural network (CRNN), convolutional neural network (CNN), other neural network, or other trained model acting as a feature extractor. The audio feature data 406 may correspond to a two-dimensional feature map where one dimension corresponds to time and another dimension corresponds to feature data. Thus, for each time unit of feature data will include a number of feature data values for that time unit. Thus the audio feature data 406 may track a certain number of dimensions worth of feature data for each time unit. The resolution of each time unit for the audio feature data 406 may not necessarily be the same as the original input audio data 402. For example, one time unit of the audio feature data 406 may correspond to a longer time duration than an original audio frame (which may be the time unit for audio data 402). Thus, there may not be a one-to-one relationship between a unit of audio data 402 and a unit of audio feature data 406. For example, one time unit of the audio feature data 406 may correspond to eight audio data frames, four audio data frames, or a different time unit that does not correspond to an integer number of audio frames—various such time units are possible using the system. Each time unit of audio feature data 406 may thus include data corresponding to many different original audio data frames. The time resolution may depend on system configuration. The audio feature data 406 may be data in a time domain or frequency domain, may include binned data according to frequency ranges or time ranges, may include different configurations of features, etc. Configuration of the audio feature data 406 may also depend on configuration of the feature extractor 404.

The feature data 406 may correspond to one or more values in feature dimensions that may be used by other models in performing further operations. The feature data 406 may include values that represent features of the audio, such as timber, pitch, volume, or other such values; the feature data 406 may further include values that represent features of the audio that do not correspond directly to features such as timber, pitch, volume, or other such values. In certain instances the feature extractor 404 may be trained using a classifier so that the feature extractor 404 learns the feature data most useful to the later operations.

To produce the audio feature data 406, the feature extractor 404 may be configured as a CRNN. A residual network structure may be used as the convolutional network in the feature extractor CRNN, which may include two convolutional blocks. The feature extractor CRNN may include a number of layers. A bottom convolutional layer may input the audio data 402 and with a stride of (2,1) (meaning the layer may skip an output every two timestamps). The CRNN then may have a max pooling layer with a stride of (2,2) resulting in a 2× time dimensionality reduction and a 2× frequency reduction. The result of the max pooling is then processed by the next two convolutional blocks/residual network blocks (e.g., Cony 3×3, 64), the output of which is then processed by the next two convolutional blocks (Cony 3×3, 128). An average pooling block may then be used to further reduce the dimensionality before feeding into a bi-directional gated recurrent unit (GRU) layer to produce the audio feature data 406. The audio feature data 406 may have a time scale of 186 ms, e.g., eight times the resolution of an input spectrogram. The number of units in the feature data may correspond to the number of units in the bi-directional GRU layer of the CRNN.

An acoustic model 408 may receive the acoustic features 406 and output corresponding phonetic probabilities 410. The phonetic probabilities 410 may represent the different ways a spoken utterance may be interpreted (i.e., different hypotheses) and may assign a probability or a confidence score representing the likelihood that a particular set of words matches those spoken in an utterance. The phonetic probabilities 410 may be based on a number of factors including, for example, the similarity of the sound in the utterance to models for language sounds and the likelihood that a particular word that matches the sounds would be included in the sentence at the specific location (e.g., using a language or grammar model). Thus each potential textual interpretation of the spoken utterance (hypothesis) is associated with a confidence score. The acoustic model 408 may also output multiple hypotheses in the form of a lattice or an N-best list with each hypothesis corresponding to a confidence score or other score (such as probability scores, etc.

The acoustic model 408 may include rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

The acoustic model 408 may include one or more HMMs that may be used to determine the probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.).

An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The wakeword detector 412 may output a wakeword-detection hypothesis score 414 using the phonetic probabilities 410. As explained in greater detail below, the wakeword detector 412 may include one or more HMMs. A second-stage classifier 416 may be used to create a score corresponding to determination of detection or non-detection 418 of the wakeword; in some embodiments, however, the wakeword detector 412 determines this score without using the second-stage classifier 416. For example, the wakeword detector 412 may determine that the wakeword is represented in the phonetic probabilities 410 if the wakeword detection hypothesis score 414 is greater than a threshold (e.g., 75% or 0.75).

The wakeword-detection sensitivity of the wakeword detector 412 and/or second-stage classifier 416 may be altered in response to determining device-use data corresponding to the device 110 and determining a wakeword-detection parameter corresponding to the device-use data. In various embodiments, the wakeword-detection sensitivity is a threshold score to which a score determined by the wakeword detector 412 and/or second-stage classifier 416 is compared. If, for example, the determined score is greater than the threshold score, the wakeword detector 412 and/or second-stage classifier 416 determine that the wakeword is present in the audio data 402; if the score is less than the threshold score, the wakeword detector 412 and/or second-stage classifier 416 determine that the wakeword is not present in the audio data 402.

The second-stage classifier 416 may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence.

Alternatively, the various models 404, 408, 412, 416 may be trained by the server(s) 120 and sent to the respective wakeword detection component 220 or 222 once trained. Thus, the audio data (and/or vectors) representing user speech of entire user inputs, or just wakeword portions of the user inputs, may be sent to the server(s) 120 via the network 199; the server(s) 120 may train one or more models using the audio data (and/or vectors); thereafter the server(s) 120 may send the trained model(s) to the device 110.

The trained wakeword detection components 220, 220 implemented by the device 110 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the components including backpropagation, statistical learning, supervised learning, semi-supervised learning, stochastic learning, or other known techniques.

Figure 5:
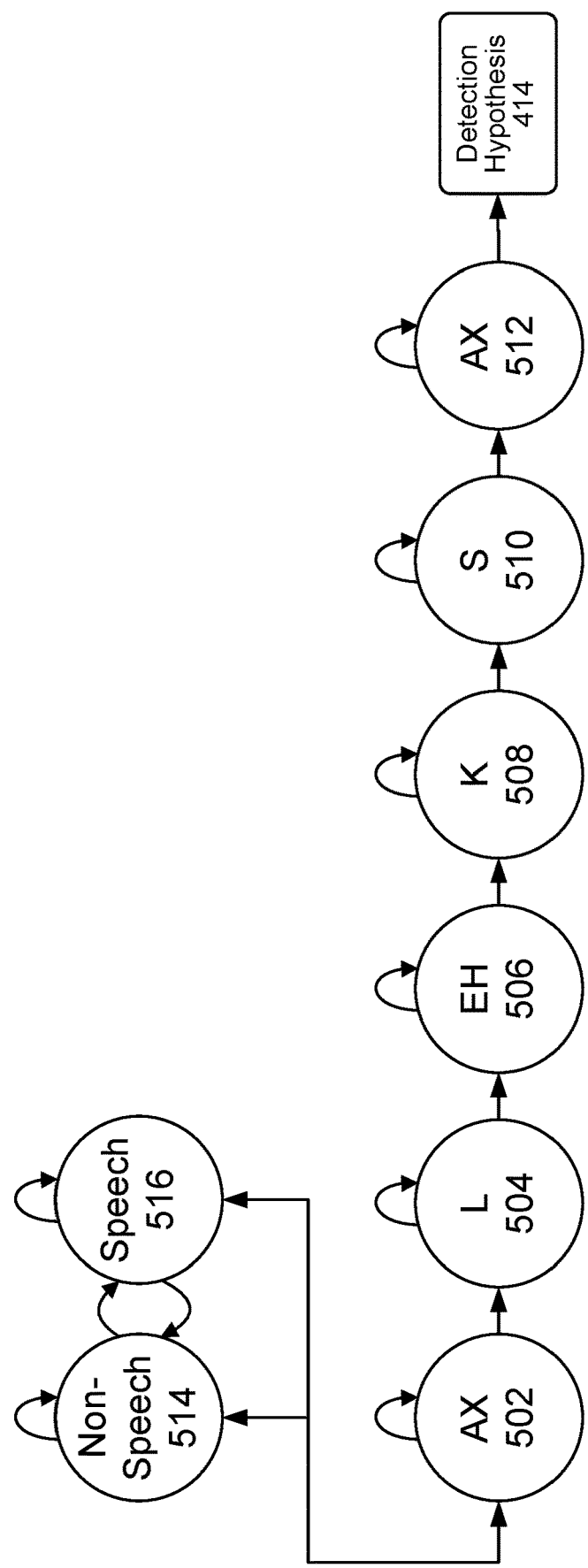
FIG. 5 is a conceptual diagram of a speech-processing model according to embodiments of the present disclosure.

FIG. 5 illustrates a HMM for detecting a wakeword in accordance with embodiments of the present disclosure. As illustrated, the HMM detects the wakeword "Alexa," but one of skill in the art will understand that the HMM can be used to detect any keyword. The HMM determines that the phonetic probabilities 410 indicate that a first acoustic unit corresponding to the wakeword, "AX" 502, is present in the phonetic probabilities 410. The HMM may then determine that further acoustic unit corresponding to the wakeword, "L" 504, "EH" 506, "K" 508, "S" 510, and "AX" 512 are present in the phonetic probabilities 410 (in that order). Each acoustic unit may be represented in the HMM as a state; once the corresponding acoustic unit is detected, the HMM may advance to a next state. Upon determination of the last acoustic unit "AX" 512, the HMM may output the detection hypothesis XXX14 indicting a likelihood of detection of the wakeword. If an expected next acoustic unit is not detected (e.g., the audio contains one or more acoustic units but not a next acoustic unit, the HMM may advance to a state corresponding to non-speech 514 or non-wakeword speech 516. The HMM may remain in the non-speech state 514 while it detects non-speech (e.g., silence, non-speech sounds, or other audio) and may remain in the speech state 516 while it detects speech that does not correspond to the wakeword (e.g., speech that includes words other than the wakeword). When the HMM detects the wakeword, it may transition from either the non-speech state 514 or the speech state 516 to the wakeword-detection states 502-512.

Viterbi decoding may be performed for the competing foreground wakeword path and background speech/non-speech path, and wakeword hypothesis may be triggered when a log-likelihood ratio of the foreground path versus the background path exceeds a predetermined threshold. Once the ratio exceed the predetermined threshold, features may be extracted from the audio data and fed into one or more second stage classifiers, which could be a support vector machine (SVM) or deep neural network (DNN). The second stage classifier(s) may determine if the features correspond to a wakeword or not.

In various embodiments, the first-stage speech-processing component 220 may use one of a plurality of wakeword-detection models, such as the HMM of FIG. 4. The first-stage speech-processing component 220 may, for example, be implemented on a DSP that includes an interface, such as an application-programming interface (API), that allows communication with another system or device, such as the device 110 or second-stage speech-processing component 222. The other system or device may send a command, via the API, to the first-stage speech-processing component 220 to receive a different wakeword-detection model than the one the first-stage speech-processing component 220 is currently using, and may subsequently send data corresponding to the different wakeword-detection model. The first-stage speech-processing component 220 may then receive the different wakeword-detection model and load it into memory, firmware, or similar storage for use; the first-stage speech-processing component 220 may then use the different wakeword-detection model for wakeword detection. In some embodiments, the first-stage speech-processing component 220 includes a plurality of wakeword-detection models; in these embodiments, the other device or system sends a command, via the API, to instruct the first-stage speech-processing component 220 to use a different wakeword-detection model but need not send data corresponding to the model.

The device 110 may select a new wakeword-detection model based on the device-use data corresponding to the device 110, such as the location that the device 110 is currently disposed in. The device 110 may determine the location by processing input from one or more input devices. These input devices may include, for example, a camera, a microphone, an accelerometer, a gyroscope, a biometric sensor, a global positioning system (GPS), a thermometer, an antenna, or other such sensors. The device 110 may instead or in addition determine its location by receiving location data from another device, such as the server 120.

Possible locations include home, work, public, private, quiet, and/or noisy locations; a wakeword-detection model may be selected after the device 110 determines it is disposed in one or more locations. The device 110 may determine that its location is the home location based on, for example, current GPS data matching saved home GPS data in a user profile, connection to a known home wireless network, connection to a known device, or captured image data matching saved image data in a user profile. The device 110 may determine that it is disposed in an location is the work location based on, for example, current GPS data matching saved work GPS data in a user profile, connection to a known work wireless network, or captured image data matching saved image data in a user profile. The device 110 may determine that its location is a public location based on, for example, current GPS data matching a location of a public space, captured audio corresponding to a plurality of one or more unknown voices, or motion data corresponding to travel or transit. The device 110 may determine that its location is a private location based on, for example, determining that no unknown voices have been detected by a microphone for a period of time or determining that no unknown persons have been detected by an image device for a period of time. The device 110 may determine that its location is a quiet location based on, for example, determining that a volume level of received audio is below a threshold; the device 110 may determine that its location is a noisy location based on, for example, determining that a volume level of received audio is above a threshold.

The device 110 may process input from multiple sensors to determine the location. For example, if the GPS or accelerometer of the device 110 indicates a speed corresponding to travel in a vehicle, the device 110 may process input from an additional sensor (e.g., a microphone or camera) to determine the type of vehicle and its corresponding location. If, for example, the audio data includes a representation of road noise but not a representation of speech from multiple speakers, the device 110 may determine that the vehicle is an automobile and that the location is a private location. If, however, the audio data includes a representation of speech from multiple speakers, the device 110 may determine that the vehicle is a bus or train and that the location is a public location. Similarly, the device 110 may process image data captured by the camera and compare the captured image data to stored image data of automobiles and busses to determine the type of vehicle.

The wakeword-detection model may be implemented to perform specifically for one or more locations. For example, in the home location, the wakeword-detection model may be implemented to detect wakewords from a first group of users (e.g., residents of the home or adults of the home) and to reject wakewords from a second group of users (e.g., non-residents of the home or children of the home). The home-location wakeword-detection model may be further implemented to reject wakewords from non-human sources of audio, such as televisions, radios, and pets. The work-location wakeword-detection model may be implemented to detect wakewords from only the user of the device and/or from designated co-workers of the user. The work-location wakeword-detection model may further be implemented to detect a different, work-related wakeword or to not detect wakewords at all. The public-location wakeword-detection model may be implemented to detect wakewords from only the user of the device, and may be location to account for public-space-related background noise, such as car noise, speech noise, or wind noise. The private-location wakeword-detection model may be implemented to detect wakewords from only the user of the device and/or from one or more other persons present in the private location. The quiet- and noisy-location wakeword-detection models may be implemented to have higher and lower sensitivities, respectively, for detecting a wakeword.

The wakeword-detection models may be implemented for their corresponding locations via training, as described herein, using location-specific training data. For example, the home-location wakeword-detection model may be trained using speech data corresponding to speech of a user and/or family member; home-location wakeword-detection model may instead or in addition be trained using speech data from other persons to, for example, distinguish between adult and child voices. The public-location wakeword-detection model may be trained using speech data corresponding to the wakeword being uttered in a noisy location. The wakeword-detection models corresponding to other locations may be trained using data corresponding to their locations.

In various embodiments, the wakeword-detection model of the first-stage speech-processing component 220 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

In some embodiments, this generalization of the first-stage speech-processing component 220 (i.e., to be agnostic regarding country, region, or area regarding wakeword detection) results in an increased number of false-positive detections of the wakeword thereby; in these embodiments, the second-stage speech-processing component 222 is customized to detect wakewords in fewer accents (e.g., only one or two) than the first-stage speech-processing component 220 and filters the resultant false-positive detections of the wakeword. In some embodiments, the location of the device 110 corresponds to one or more accents corresponding to a country, region, or other area; the device 110 may, in these embodiments, command the first-stage speech-processing component 220 to configure a different wakeword-detection model based on the country, region, or other area. These accent-specific wakeword-detection models may be implemented via training data corresponding to the country, region, or other area.

The device 110 and/or the second-stage speech-processing component 222 may, in addition or instead of changing the wakeword-detection model of the first-stage speech-processing component 220, configure the first-stage speech-processing component 220 to have a different wakeword-detection threshold and/or speaker-identification threshold.

The wakeword-detection parameter may be a threshold at which the first-stage speech-processing component 220 determines that a candidate wakeword in captured audio data is sufficiently similar to a stored representation of the wakeword such that the first-stage speech-processing component 220 determines that the wakeword is indeed present in the captured audio data. The first-stage speech-processing component 220 may, for example, determine a similarity score for the candidate wakeword based on how similar it is to the stored wakeword; if the similarly score is higher than the wakeword-detection threshold, the first-stage speech-processing component 220 determines that the wakeword is present in the audio data, and if the similarity score is less than the wakeword-detection threshold, the first-stage speech-processing component 220 determines that the wakeword not is present in the audio data. For example, if the candidate wakeword matches the stored wakeword very closely, the first-stage speech-processing component 220 may determine a similarity score of 100; if the candidate wakeword does not match the stored wakeword at all, the first-stage speech-processing component 220 may determine a similarity score of 0. If the first-stage speech-processing component 220 determines candidate wakeword partially matches the stored wakeword, it may determine an intermediate similarity score, such as 75 or 85.

Though the disclosure herein describes a similarity score of zero to 100—wherein zero is least similar and 100 is most similar—and though the following examples carry through this type of similarity score, the present disclosure is not limited to any particular range of values of the similarity score, and any system or method of determining similarity between a candidate wakeword represented in captured audio data and a stored representation of the wakeword is within the scope of the present disclosure.

The device 110 and/or the second-stage speech-processing component 222 may command the first-stage speech-processing component 220, via the API, to change the wakeword-detection threshold based on determined device-use data corresponding to of the device 110, such as a location of the device 110. For example, if the location is a home or quiet location, the device 110 and/or the second-stage speech-processing component 222 may command the first-stage speech-processing component 220 to lower the wakeword-detection threshold (to, for example, 50). If the location is a public or noisy location, the device 110 and/or the second-stage speech-processing component 222 may command the first-stage speech-processing component 220 to raise the wakeword-detection threshold (to, for example, 90).

The device 110 and/or the second-stage speech-processing component 222 may further command the first-stage speech-processing component 220, via the API, to change the wakeword-detection threshold based on a number of false-positive wakeword detections. If the number of false-positive wakeword detections is high (e.g., more than ten per minute), the device 110 and/or the second-stage speech-processing component 222 may command the first-stage speech-processing component 220, via the API, to raise the wakeword-detection threshold (to, for example, 75); if the number of false-positive wakeword detections is low (e.g., less than one per minute), the device 110 and/or the second-stage speech-processing component 222 may command the first-stage speech-processing component 220, via the API, to lower the wakeword-detection threshold (to, for example, 50).

The device 110 and/or the second-stage speech-processing component 222 may further command the first-stage speech-processing component 220, via the API, to change the wakeword-detection threshold based determining a connection to a power source, such as an electrical outlet. If the device 110 is not connected to the power source, the device 110 and/or the second-stage speech-processing component 222 may command the first-stage speech-processing component 220, via the API, to raise the wakeword-detection threshold (to, for example, 75); if the device 110 is connected to the power source, the device 110 and/or the second-stage speech-processing component 222 may command the first-stage speech-processing component 220, via the API, to lower the wakeword-detection threshold (to, for example, 50).

The device 110 and/or the second-stage speech-processing component 222 may further command the first-stage speech-processing component 220, via the API, to change the wakeword-detection threshold based on user input. If, for example, the user uttered the wakeword but the device 110 did not wake in response, the user may provide additional input, such as a button press, touch input, or an additional utterance to indicate the false-negative detection of the wakeword. In response to this additional input, the device 110 may lower the wakeword-detection threshold by, for example, 5, 10, or 25 values. If the user provides further input indicating additional false-negative detections of the wakeword, the device 110 may lower the wakeword-detection threshold still further; the device 110 may, however, stop lowering the wakeword-detection threshold, even if further input is received, once a minimum value is reached. Similarly, the user may provide input indicating false-positive detection of the wakeword; the device 110 may similarly raise the wakeword-detection threshold in response (in some embodiments, until a maximum value is reached). The device 110 may further change the speaker-identification threshold based on user input.

The device 110 and/or the second-stage speech-processing component 222 may command the first-stage speech-processing component 220, via the API, to change the speaker-identification threshold based on the determined device-use data corresponding to the device 110, such as a location of the device 110. The speaker-identification threshold is a threshold at which the first-stage speech-processing component 220 determines that candidate speech in captured audio data is sufficiently similar to a stored representation of the speech corresponding to a user such that the first-stage speech-processing component 220 determines that the candidate speech was spoken by the user. The candidate speech may or may not include a wakeword. The first-stage speech-processing component 220 perform one or more actions upon determining that the similarity between the candidate speech and stored speech is greater than the speaker-identification threshold, such as executing a command represented by the speech.

In some embodiments, the device 110 and/or the second-stage speech-processing component 222 adjusts both the wakeword-detection threshold and the speaker-identification threshold upon determining that the device 110 is disposed in a certain location. For example, if the location is a private or home location, the device 110 and/or the second-stage speech-processing component 222 may command the first-stage speech-processing component 220 to raise its wakeword-detection threshold (to, e.g., 75) and lower its speaker-identification threshold (to, e.g., 25). This configuration of the thresholds may cause the first-stage speech-processing component 220 to detect wakewords in speech from any speaker (because the device 110 is in a trusted location) but only when it is sure that the wakeword was uttered (because the device 110 may be more trained to detect wakewords from known speakers). If the location is a public or work location, the device 110 and/or the second-stage speech-processing component 222 may command the first-stage speech-processing component 220 to lower its wakeword-detection threshold (to, e.g., 25) and raise its speaker-identification threshold (to, e.g., 75). This configuration of the thresholds may cause the first-stage speech-processing component 220 to detect wakewords in speech from only a known speaker (because the device 110 is in an untrusted location) and detect the wakeword more often (because the device 110 may be disposed in a noisy location).

The device 110 may further determine the wakeword-detection model, wakeword-detection threshold, and/or speaker-identification threshold based on a time of day and/or time of year. For example, if the device 110 determines that the time of day corresponds to a nighttime or late-night time, the device 110 and/or the second-stage speech-processing component 222 may command the first-stage speech-processing component 220, via the API, to raise the speaker-identification threshold to, for example, 75; to lower the wakeword-detection threshold to, for example, 50; and to use a wakeword-detection model that corresponds to a quiet or private location. If the device 110 determines that the time of day corresponds to a travel or commute time, the device 110 and/or the second-stage speech-processing component 222 may command the first-stage speech-processing component 220, via the API, to lower the speaker-identification threshold to, for example, 50; to raise the wakeword-detection threshold to, for example, 75; and to use a wakeword-detection model that corresponds to a noisy location. If the device 110 determines that the time of day corresponds to a workplace time, the device 110 and/or the second-stage speech-processing component 222 may command the first-stage speech-processing component 220, via the API, to raise the speaker-identification threshold to, for example, 75; to lower the wakeword-detection threshold to, for example, 50; and/or to use a wakeword-detection model that corresponds to a work location.

The device 110 may further determine the wakeword-detection model, wakeword-detection threshold, and/or speaker-identification threshold based on a determined speech impediment of a user. For example, if the device 110 determines that the user has difficulty speaking due to a lisp, partial paralysis, or other language impediment—or if the user is simply a young person or non-native-language speaker–the device 110 and/or the second-stage speech-processing component 222 may command the first-stage speech-processing component 220, via the API, to raise the speaker-identification threshold (to, for example, 75); to lower the wakeword-detection threshold (to, for example, 50); and/or to use a wakeword-detection model that corresponds to the determined speech impediment or difficulty.

The system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

As detailed above, the server(s) 120 may include a user-recognition component 295 that recognizes one or more users using a variety of data. The device 110 may also or instead include a user-recognition component 295. The device 110 may use the user-recognition component 295 in conjunction with the trained speech-processing component(s) (314/322) to determine whether the user, whose speech was used to train the wakeword detection component(s), spoke a wakeword in received audio.

Figure 6:
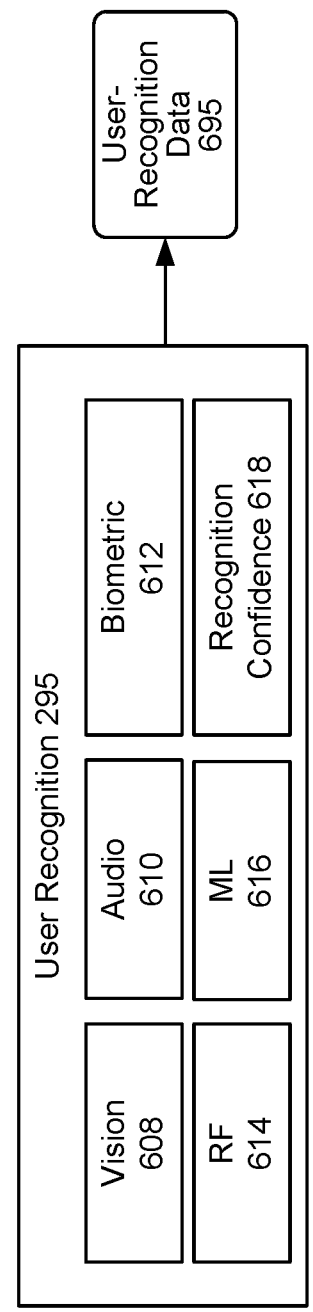
FIG. 6 is a schematic diagram of an illustrative architecture in which sensor data is combined to recognize one or more users according to embodiments of the present disclosure.

As illustrated in FIG. 6, the user-recognition component 295 may include one or more subcomponents including a vision component 608, an audio component 610, a biometric component 612, a radio-frequency (RF) component 614, a machine-learning (ML) component 616, and a recognition confidence component 618. In some instances, the user-recognition component 295 may monitor data and determinations from one or more subcomponents to determine an identity of one or more users associated with data input to the system. The user-recognition component 295 may output user-recognition data 695, which may include a user identifier associated with a user the system believes is originating data input to the system. The user-recognition data 695 may be used to inform processes performed by the orchestrator 240 (or a subcomponent thereof) as described below.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user-recognition component 295 may utilize determinations from additional components to determine an identity of a user. The vision component 608 can be used in conjunction with other components to determine an identity of a user. For example, the user-recognition component 295 may use data from the vision component 608 with data from the audio component 610 to identify what user's face appears to be speaking at the same time audio is captured by the device 110 for purposes of identifying a user who spoke an input to the device 110.

The device 110 may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user.

The RF component 614 may use RF localization to track devices that a user may carry or wear. For example, a user may be associated with a device. The device may emit RF signals (e.g., Wi-Fi, Bluetooth®, etc.). The device 110 may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, the device 110 may include some RF or other detection processing capabilities so that a user who speaks an input may scan, tap, or otherwise acknowledge his/her personal device to the device 110. In this manner, the user may "register" with the device 110 for purposes of the device 110 determining who spoke a particular input. Such a registration may occur prior to, during, or after speaking of an input.

The ML component 616 may track the behavior of various users as a factor in determining a confidence level of the identity of the user. For example, a user may adhere to a regular schedule such that the user is at a first location during the day (e.g., at work or at school). In this example, the ML component 616 factors in past behavior and/or trends into determining the identity of the user that provided input to the device 110. Thus, the ML component 616 may use historical data and/or usage patterns over time to increase or decrease a confidence level of an identity of a user.

In some instances, the recognition confidence component 618 receives determinations from the various components 608, 610, 612, 614, and 616, and may determine a final confidence level associated with the identity of a user. The confidence level or other score data may be included in the user-recognition data 695.

The audio component 610 may receive data from one or more sensors capable of providing an audio signal (e.g., one or more microphones) to facilitate recognizing a user. The audio component 610 may perform audio recognition on an audio signal to determine an identity of the user and associated user identifier. In some instances, the audio component 610 may perform voice recognition to determine an identity of a user.

The audio component 610 may also perform user identification based on audio received by the device 110. The audio component 610 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 610 may perform user recognition by comparing audio characteristics representing the audio to stored audio characteristics of users.

Figure 7:
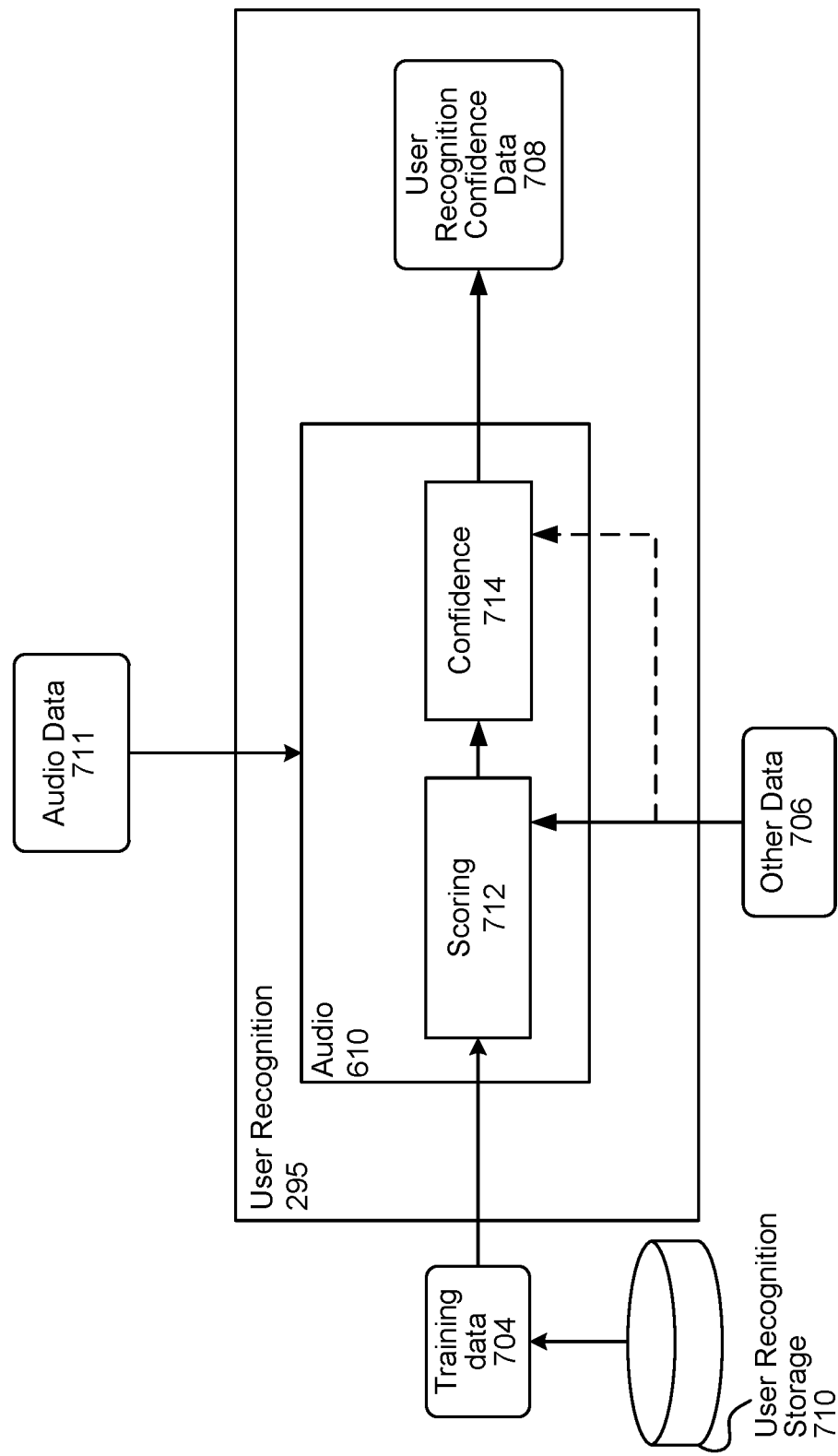
FIG. 7 is a system flow diagram illustrating user-recognition processing according to embodiments of the present disclosure.

FIG. 7 illustrates the audio component 610 of the user-recognition component 295 performing user recognition using audio data 711 representing speech. The audio component 610 may output user recognition confidence data 708 that reflects a certain confidence that the audio data 711 represents speech originating from the user 5. Training data 704 may be stored in a user recognition storage 710. The training data 704 may include the audio data (and/or vectors) used to train the wakeword detection component(s) 220, 222.

The training data 704 stored in the user recognition storage 710 may be stored as waveforms and/or corresponding features/vectors. The training data 704 may correspond to data from various audio samples. The audio samples may correspond to voice profile data for the user 5. Thus, the training data 704 may include a biometric representation of the user's voice. The audio component 610 may use the training data 504 to compare against the audio data 711 to determine whether the user 5 spoke the speech represented in the audio data 711.

If the audio component 610 receives training data 704 as an audio waveform, the audio component 610 may determine features/vectors of the waveform(s) or otherwise convert the waveform(s) into a data format (e.g., fingerprint) that can be used by the audio component 610 to actually perform user recognition. Likewise, if the audio component 610 receives the audio data 711 as an audio waveform, the audio component 610 may determine features/vectors of the waveform(s) or otherwise convert the waveform(s) into a fingerprint unique to the audio data 711. A fingerprint may be unique but irreversible such that a fingerprint is unique to underlying audio data but cannot be used to reproduce the underlying audio data. The audio component 610 may determine the user 5 spoke the speech represented in the audio data 711 by comparing features/vectors/fingerprint representing the audio data 711 to training features/vectors/fingerprint received from the user recognition storage 710.

The audio component 610 may include a scoring component 712 that determines a score the audio component's confidence that the speech was spoken by the user 5. The audio component 610 may also include a confidence component 714 that determines an overall confidence of the user recognition operations (such as those of the scoring component 712). The output from the scoring component 712 may include the score for the user 5. Although illustrated as two separate components, the scoring component 712 and confidence component 714 may be combined into a single component or may be separated into more than two components.

The scoring component 712 and confidence component 714 may implement one or more trained machine learning models (such neural networks, classifiers, etc.) as known in the art. For example, the scoring component 712 may use probabilistic linear discriminant analysis (PLDA) techniques. PLDA scoring determines how likely it is that an audio data feature vector corresponds to a particular training data feature vector associated with a particular user identifier. The PLDA scoring may generate a similarity score for the training feature vector considered and may output the score, representing the likelihood that the user 5 spoke the audio. The scoring component 712 may also use other techniques such as GMMs, generative Bayesian models, or the like to determine similarity scores.

The confidence component 714 may input various data including audio length (e.g., number of frames of the audio data 711), audio condition/quality data (such as signal-to-interference data or other metric data), fingerprint data, image data, or other data to consider how confident the audio component 610 is with regard to the score representing the user 5 spoke the speech. Precise determination of the confidence score may depend on configuration and training of the confidence component 714 and the models used therein. The confidence component 714 may operate using a number of different machine learning models/techniques such as GMM, neural networks, etc. For example, the confidence component 714 may be a classifier configured to map a score output by the scoring component 712 to a confidence.

The audio component 610 may output user recognition confidence data 708 representing the audio component's confidence that the user 5 spoke the speech. The user recognition confidence data 708 may include a particular score (e.g., 0.0-1.0, 0-1000, or whatever scale the system is configured to operate). Alternatively or in addition, the user recognition confidence data 708 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high."

The user-recognition component 295 may combine data from components 608-618 to determine the identity of the user 5. As part of its audio-based user recognition operations, the audio component 610 may use other data 706 to inform user recognition processing. A trained model or other component of the audio component 610 may be trained to take other data 706 as an input feature when performing recognition. The other data 706 may include a wide variety of data types depending on device configuration. The other data 706 may device-use data corresponding to the device 110, such as a time of day at which the audio data 711 was captured, a day of a week in which the audio data 711 was captured, image data or video data, device 110 location data, and/or other data. The user recognition confidence data 708 output by the audio component 610 may be used by other components of the user-recognition component 295 and/or the wakeword detection component(s) 220, 222.

Figure 8:
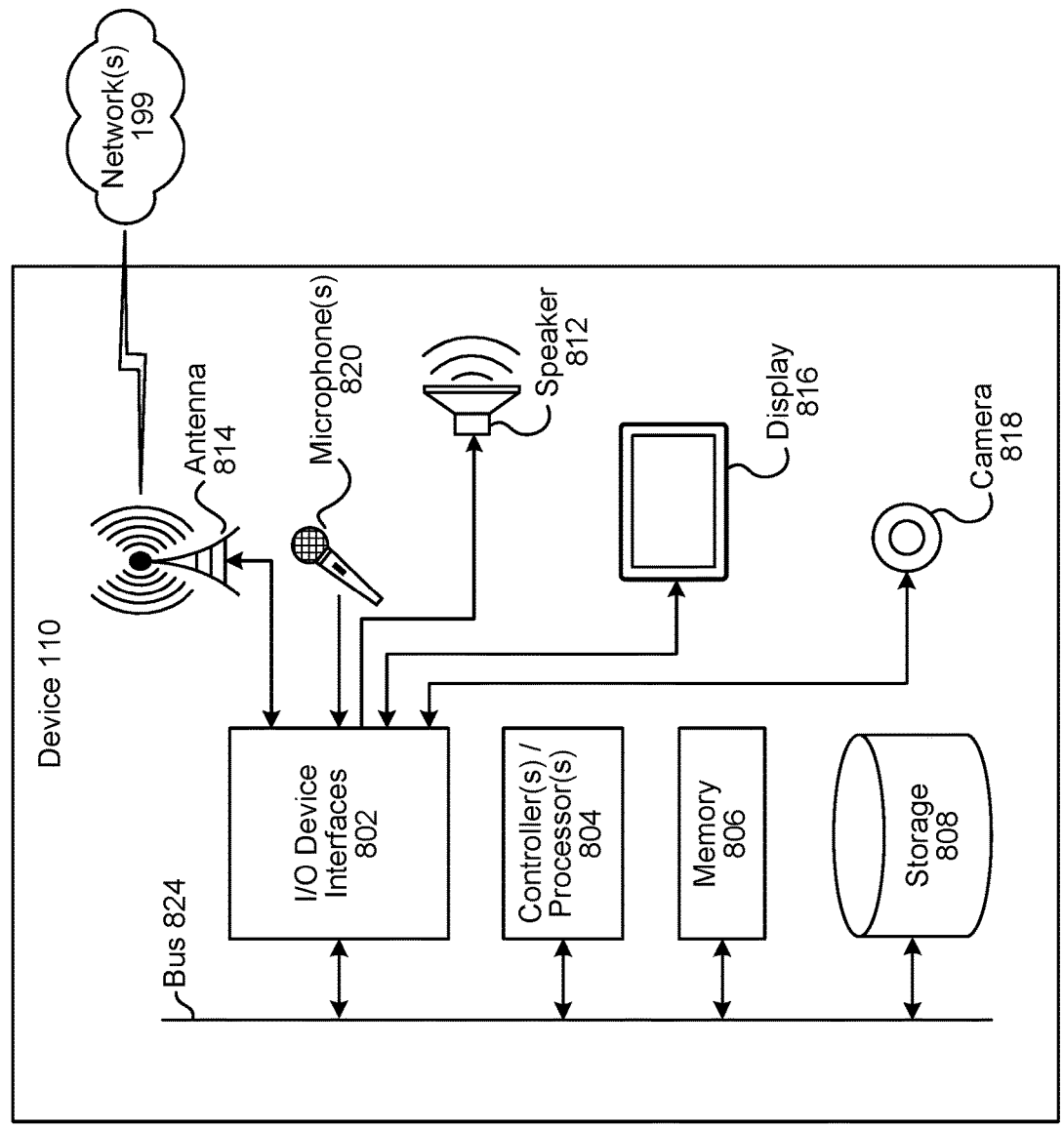
FIG. 8 is a block diagram conceptually illustrating example components of a device according to embodiments of the present disclosure.
Figure 9:
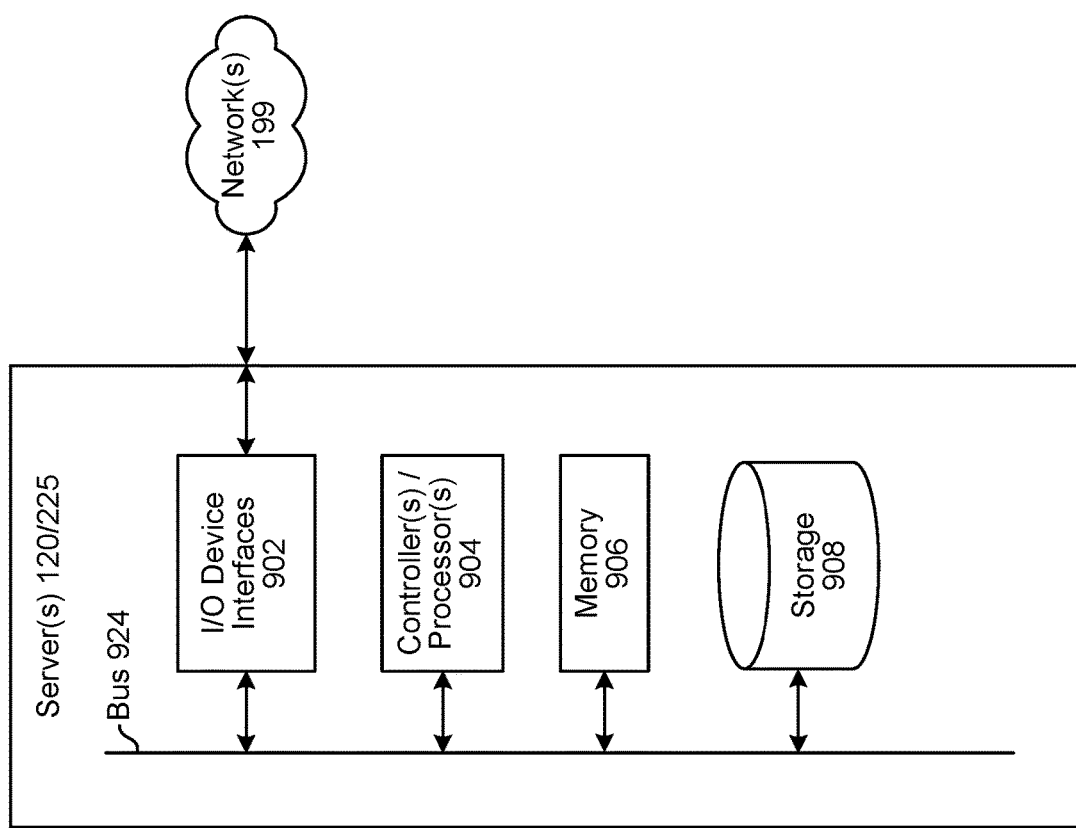
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill server(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (804/904), which may each include one or more central processing units (CPUs) and one or more digital-signal processors (DSPs) for processing data and computer-readable instructions, and a memory (806/906) for storing data and instructions of the respective device. As described above, the one or more CPUs may be used to implement the second-stage speech-processing component 222 and the one or more DSPs may be used to implement the first-stage speech-processing component 220. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content corresponding to content data. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (802/902), processor(s) (804/904), memory (806/906), and/or storage (808/908) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 225, as described herein, are illustrative, and may be located as a stand-alone device or may be included, in whole or in part, as a component of a larger device or system.

Figure 10:
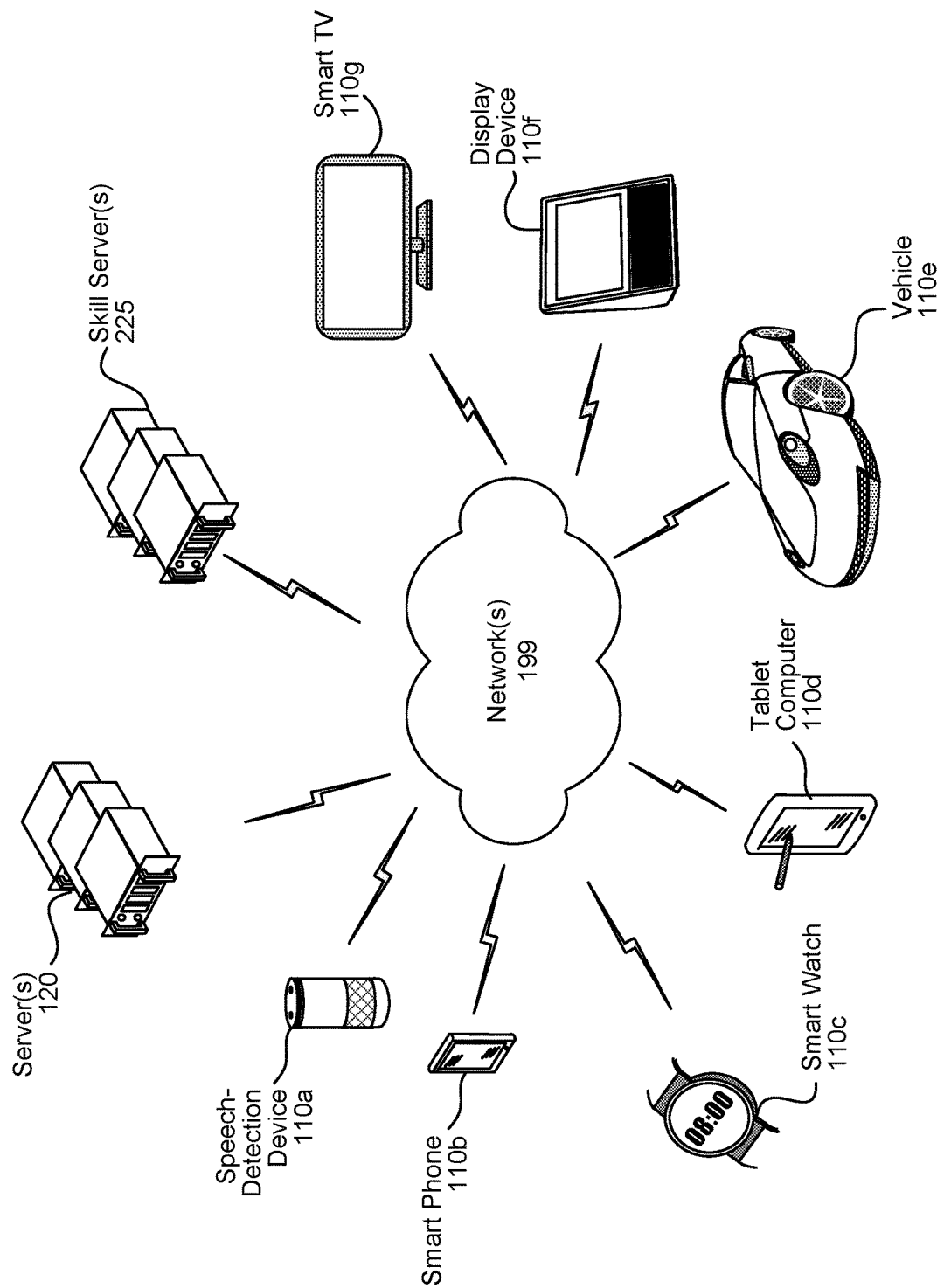
FIG. 10 illustrates an example of a computer network for use with the speech processing system.

As illustrated in FIG. 10, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a Wi-Fi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for detecting a wakeword using a voice-controlled device, the method comprising:
   receiving device-use data corresponding to a location of the voice-controlled device;
   determining that the location is a public location;
   based at least in part on determining that the location is the public location, sending, to a first speech-processing component implemented at least in part by a digital signal processor (DSP) of the voice-controlled device, a command from a second speech-processing component to lower a wakeword-detection threshold of the first speech-processing component;
   receiving, from a microphone, audio data representing a user input;
   determining, using the first speech-processing component, that the audio data includes a representation of a wakeword;
   based at least in part on determining that the audio data includes the representation of the wakeword, sending the audio data to at least one central processing unit (CPU) of the voice-controlled device, the at least one CPU different than the DSP;
   determining, using the second speech-processing component, that the audio data includes the representation of the wakeword, wherein the second speech-processing component is implemented at least in part by the at least one CPU;
   sending, to at least one component of a speech processing system that is located remotely from the voice-controlled device, the audio data;
   receiving, from the speech processing system, content data responsive to the user input; and
   outputting content corresponding to the content data.

2. The method of claim 1, further comprising:
   selecting, based at least in part on determining that the location is the public location, a wakeword-detection model corresponding to a noisy location; and
   sending, to the first speech-processing component, the wakeword-detection model,
   wherein determining that the audio data includes the representation of the wakeword comprises processing the audio data with the wakeword-detection model.

3. The method of claim 1, further comprising:
   based at least in part on determining that the location is the public location, sending, to the first speech-processing component, a second command including a parameter corresponding to a speaker-identification threshold of the first speech-processing component; and
   determining, based at least in part on the speaker-identification threshold, that the audio data corresponds to user data.

4. The method of claim 1, further comprising:
   determining that the voice-controlled device is connected to power source;
   based at least in part on determining that the voice-controlled device is connected to the power source, sending, to the first speech-processing component, a second command including a first parameter corresponding to the wakeword-detection threshold, the first parameter representing a greater likelihood of detecting the wakeword; and
   based at least in part on determining that the voice-controlled device is connected to the power source, sending, to the first speech-processing component, a third command including a second parameter corresponding to a speaker-identification threshold, the second parameter corresponding to a greater likelihood of detecting a speaker.

5. A method, comprising:
   determining device-use data corresponding to a voice-controlled device;
   determining a wakeword-detection parameter based at least in part on the device-use data, the wakeword-detection parameter corresponding to a wakeword-detection sensitivity;
   based at least in part on an indication received by a first speech-processing component of the voice-controlled device from a second speech-processing component of the voice-controlled device, determining an adjusted wakeword-detection parameter;
   receiving audio data corresponding to an utterance;
   determining presence of a wakeword represented by the audio data using the first speech-processing component, the audio data, and the adjusted wakeword-detection parameter; and
   determining, using a second speech-processing component, that the audio data includes a representation of the wakeword, wherein the second speech-processing component is different from the first speech-processing component.

6. The method of claim 5, further comprising:
   selecting a wakeword-detection model corresponding to the device-use data; and
   sending, to the first speech-processing component of the voice-controlled device, the wakeword-detection model,
   wherein determining the presence of the wakeword represented by the audio data comprises processing the audio data with the wakeword-detection model.

7. The method of claim 5, wherein determining the device-use data comprises:
   determining a time of day corresponding to receiving the audio data;
   determining, based at least in part on a user profile, a location corresponding to the time of day; and
   determining that the device-use data corresponds to the location.

8. The method of claim 5, further comprising:
   determining a noise level corresponding to the device-use data;
   determining that the noise level is greater than a threshold; and
   based on the noise level being greater than the threshold, determining that the device-use data corresponds to a public location.

9. The method of claim 5, further comprising:
   operating the first speech-processing component at least in part by a digital signal processor of the voice-controlled device, and operating the second speech-processing component at least in part by a software application installed on the voice-controlled device.

10. The method of claim 5, further comprising:
after determining that the audio data includes the representation of the wakeword, sending the audio data to at least one server;
receiving, from the at least one server, second audio data comprising a response to a command represented in the audio data; and
outputting the second audio data.

11. The method of claim 5, further comprising:
determining that the voice-controlled device is connected to a power source; and
based at least in part on determining that the voice-controlled device is connected to the power source, sending, to the first speech-processing component, the indication.

12. The method of claim 5, further comprising:
receiving input corresponding to a false-negative detection of the wakeword; and
based at least in part on receiving the input, sending, to the first speech-processing component, the indication.

13. The method of claim 5, further comprising:
consuming less power with the first speech-processing component of the voice-controlled device than with the second speech-processing component of the voice-controlled device,
wherein the second speech-processing component is a higher-accuracy speech-processing component than the first speech-processing component.

14. The method of claim 5, further comprising:
operating the first speech-processing component by a digital signal processor of the voice-controlled device using less power than a central processing unit operating the second speech-processing component of the voice-controlled device,
wherein the second speech-processing component is a higher-accuracy speech-processing component than the first speech-processing component.

15. The method of claim 5, further comprising:
determining that second device-use data corresponds to a public location; and
based at least in part on determining that the second device-use data corresponds to the public location, sending the indication from the second speech-processing component to the first speech-processing component, the indication indicating to adjust the wakeword-detection parameter.

16. A system comprising:
at least one processor; and
at least one memory including instructions that, when executed by the at least one processor, cause the system to:
determine device-use data corresponding to a voice-controlled device;
determine a speaker-identification parameter based at least in part on the device-use data, the speaker-identification parameter corresponding to a speaker-identification sensitivity;
causing a first speech-processing component of the voice-controlled device to operate using the speaker-identification parameter;
receive audio data corresponding to an utterance;
determine, using the first speech-processing component and the speaker-identification parameter, that the audio data corresponds to user data;
determine, using a second speech-processing component of the voice-controlled device, that the audio data corresponds to the user data, wherein the second speech-processing component is different from the first speech-processing component; and
based at least in part on using the first speech-processing component and the second speech-processing component to determine that the audio data corresponds to the user data, determining that the utterance originated from a particular user.

17. The system of claim 16, wherein the at least one memory further includes instructions that, when executed by the at least one processor, further cause the system to:
select a wakeword-detection model corresponding to the device-use data; and
send, to the first speech-processing component of the voice-controlled device, the wakeword-detection model,
wherein determining that the audio data corresponds to the user data comprises processing the audio data with the wakeword-detection model.

18. The system of claim 16, wherein the at least one memory further includes instructions that, when executed by the at least one processor, further cause the system to:
determine a time of day corresponding to receiving the audio data;
determine, based at least in part on a user profile, a location corresponding to the time of day; and
determine that the device-use data corresponds to the location.

19. The system of claim 16, wherein the at least one memory further includes instructions that, when executed by the at least one processor, further cause the system to:
determine a noise level corresponding to the device-use data;
determine the noise level is greater than a threshold; and
based on the noise level being greater than the threshold, determining that the device-use data corresponds to a public location.

20. The system of claim 16, wherein the at least one memory further includes instructions that, when executed by the at least one processor, further cause the system to:
operate the first speech-processing component at least in part by a digital signal processor of the voice-controlled device, and
operate the second speech-processing component by a software application installed on the voice-controlled device.

21. The system of claim 16, wherein the at least one memory further includes instructions that, when executed by the at least one processor, further cause the system to:
after determining that the audio data corresponds to the user data, send the audio data to at least one server;
receive, from the at least one server, second audio data comprising a response to a command represented in the audio data; and
output the second audio data.

22. The system of claim 16, wherein the at least one memory further includes instructions that, when executed by the at least one processor, further cause the system to:
determine that the voice-controlled device is connected to a power source; and
based at least in part on determining that the voice-controlled device is connected to the power source, send, to the first speech-processing component, a command to change the speaker-identification parameter.

23. The system of claim 16, wherein the at least one memory further includes instructions that, when executed by the at least one processor, further cause the system to:
   receive input corresponding to a false-negative detection of a wakeword; and
   based at least in part on receiving the input, send, to the first speech-processing component, a command to change the speaker-identification parameter.

24. The system of claim 16, wherein the at least one memory further includes instructions that, when executed by the at least one processor, further cause the system to:
   operate the first speech-processing component using at least one first processor; and
   operate the second speech-processing component using at least one second processor different from the at least one first processor.

25. The system of claim 16, wherein the at least one memory further includes instructions that, when executed by the at least one processor, further cause the system to:
   operate the first speech-processing component using at least one first processor that uses less power than at least one second processor that operates the second speech-processing component,
   wherein the second speech-processing component is a higher-accuracy speech-processing component than the first speech-processing component and the at least one second processor is different from the at least one first processor.

* * * * *